United States Patent [19]
Yoshizawa

[11] Patent Number: 5,764,220
[45] Date of Patent: Jun. 9, 1998

[54] METHOD OF DETECTING CONTACT OF MOUSE WITH SURFACE AND MOUSE UNIT USING THIS METHOD

[75] Inventor: Kenichi Yoshizawa, Kamakura, Japan

[73] Assignee: Mitsubishi Denki Kabushiki Kaisha, Tokyo, Japan

[21] Appl. No.: 409,870

[22] Filed: Mar. 24, 1995

Related U.S. Application Data

[63] Continuation-in-part of Ser. No. 98,211, Jul. 28, 1993.

[30] Foreign Application Priority Data

Sep. 11, 1992 [JP] Japan ................... 4-243564

[51] Int. Cl.$^6$ ........................... G09G 3/02
[52] U.S. Cl. ........................ 345/163; 345/164
[58] Field of Search ................... 345/157, 159, 345/163, 164, 173, 179

[56] References Cited

U.S. PATENT DOCUMENTS

| | | | |
|---|---|---|---|
| 4,987,411 | 1/1991 | Ishigami | 345/159 |
| 5,027,109 | 6/1991 | Donovan et al. | 345/165 |
| 5,195,179 | 3/1993 | Tokunago | 345/145 |
| 5,272,470 | 12/1993 | Zetts | 345/173 |
| 5,369,262 | 11/1994 | Dvorkis et al. | 345/179 |
| 5,404,458 | 4/1995 | Zetts | 345/173 |
| 5,434,595 | 7/1995 | Martinelli et al. | 345/179 |

FOREIGN PATENT DOCUMENTS

| | | | |
|---|---|---|---|
| 58114184 | 7/1983 | Japan | 345/157 |
| 2-5122 | of 1990 | Japan | |
| 2257324 | 1/1991 | Japan | |

*Primary Examiner*—Raymond J. Bayerl
*Assistant Examiner*—John Suraci
*Attorney, Agent, or Firm*—Wolf, Greenfield & Sacks, P.C.

[57] ABSTRACT

A mouse unit is used as input means for personal computers and work stations. The mouse unit is used and operated on a broad and plane surface. A proposal has been made that when a mouse is separated from a plane surface, the mouse can continue to output the data at a certain speed. Such a proposal requires a particular device for detecting the state of the mouse contacting the plane surface. The invention provides a mouse unit which can improve the operation of the mouse without the need of any particular device. The mouse unit outputs movement data which is received by a reception buffer. A processing portion estimates time when the speed of the moving mouse becomes zero from a characteristic value inherent in the mouse held in a characteristics holding portion the movement data from the reception buffer. When the processing portion detects that the mouse is not in contact with the plane surface, the movement data used to estimate a time when the mouse is separated from the plane surface is outputted from the processing portion to a system processing portion causing a cursor to be displayed on a display portion. The invention is characterized by that any conventional mouse can be detected with respect to its state and that the output of any function can be utilized when the mouse is not in contact with the plane surface. The invention easily applies to any one of a number of mice having various characteristics.

34 Claims, 20 Drawing Sheets

|   | D(X) | D(Y) | P(t) |
|---|---|---|---|
| 1 | $\Delta X_1$ | $\Delta Y_1$ | $t_{p1}$ |
| 2 | $\Delta X_2$ | $\Delta Y_2$ | $t_{p2}$ |
| 3 | $\Delta X_3$ | $\Delta Y_3$ | $t_{p3}$ |
| 4 | $\Delta X_4$ | $\Delta Y_4$ | $t_{p4}$ |
| 5 | $\Delta X_5$ | $\Delta Y_5$ | $t_{p5}$ |
| 6 | $\Delta X_6$ | $\Delta Y_6$ | |
| 7 | | | |

Fig. 6

| T | DX(T) | DY(T) | P(T) |
|---|---|---|---|
| 1 | 10 | 0 | |
| | | | |

Fig. 18

| T | DX(T) | DY(T) | P(T) |
|---|---|---|---|
| 1 | 10 | 0 | 5 |
| | | | |

Fig. 19

| T | DX(T) | DY(T) | P(T) | (X,Y) |
|---|---|---|---|---|
| 1 | 10 | 0 | 5 | (110,100) |
| 2 | 13 | 0 | 7 | (123,100) |
| 3 | 6 | 0 | 5 | (129,100) |
| 4 | 8 | 0 | 7 | (137,100) |
| 5 | 7 | 0 | 8 | (144,100) |
| | | | | |

Fig. 20

| T | DX(T) | DY(T) | P(T) |
|---|---|---|---|
| 1 | 10 | 0 | 5 |
| 2 | 13 | 0 | 7 |
| 3 | 6 | 0 | 5 |
| 4 | 8 | 0 | 7 |
| 5 | 7 | 0 | 8 |
| 6 | 0 | 0 | |

Fig. 21

| T | DX(T) | DY(T) | P(T) | (X,Y) |
|---|---|---|---|---|
| 1 | 10 | 0 | 5 | (110,100) |
| 2 | 13 | 0 | 7 | (123,100) |
| 3 | 6 | 0 | 5 | (129,100) |
| 4 | 8 | 0 | 7 | (137,100) |
| 5 | 7 | 0 | 8 | (144,100) |
| 6 | 0 | 0 | | (144,100) |
| 7 | 10 | 0 | 11 | (154,100) |
| 8 | 10 | 0 | 12 | (164,100) |

Fig. 22

| T | DX(T) | DY(T) | P(T) | (X,Y) |
|---|---|---|---|---|
| 1 | 10 | 0 | 5 | (110,100) |
| 2 | 13 | 0 | 7 | (123,100) |
| 3 | 6 | 0 | 5 | (129,100) |
| 4 | 8 | 0 | 7 | (137,100) |
| 5 | 7 | 0 | 8 | (144,100) |
| 6 | 0 | 0 | | (144,100) |
| 7 | 10 | 0 | 11 | (154,100) |
| 8 | 10 | 0 | 12 | (164,100) |
| 9 | 8 | 0 | 12 | (172,100) |
| 10 | 5 | 0 | 12 | (177,100) |
| 11 | 2 | 0 | 12 | (179,100) |
| | | | | |

Fig. 23

| T | DX(T) | DY(T) | P(T) |
|---|---|---|---|
| 1 | 10 | 0 | 5 |
| 2 | 13 | 0 | 7 |
| 3 | 6 | 0 | 5 |
| 4 | 8 | 0 | 7 |
| 5 | 7 | 0 | 8 |
| 6 | 0 | 0 | |
| 7 | 10 | 0 | 11 |
| 8 | 10 | 0 | 12 |
| 9 | 8 | 0 | 12 |
| 10 | 5 | 0 | 12 |
| 11 | 2 | 0 | 12 |
| 12 | 0 | 0 | |

Fig. 24

| T | DX(T) | DY(T) | P(T) |
|---|---|---|---|
| 1 | 10 | 0 | 5 |
| 2 | 13 | 0 | 7 |
| 3 | 6 | 0 | 5 |
| 4 | 8 | 0 | 7 |
| 5 | 7 | 0 | 8 |
| 6 | 0 | 0 | |
| 7 | 10 | 0 | 11 |
| 8 | 10 | 0 | 12 |
| 9 | 8 | 0 | 12 |
| 10 | 5 | 0 | 12 |
| 11 | 2 | 0 | 12 |
| 12 | 0 | 0 | |
| 13 | 0 | 0 | |

Fig. 25

METHOD OF DETECTING CONTACT OF MOUSE WITH SURFACE AND MOUSE UNIT USING THIS METHOD

CROSS-REFERENCE TO RELATED APPLICATIONS

The present application is a continuation-in-part of a pending application for patent filed Jul. 28, 1993, Ser. No. 08/098,211, claiming priority of Japanese Application No. 4-243564, filed Sep. 11, 1992.

FIELD OF THE INVENTION

The present invention relates to the output control of a mouse unit that is used as input and pointing means in personal computers, work-stations and others.

DESCRIPTION OF THE RELATED ART

FIG. 1 shows a plane contact detection type mouse unit constructed in accordance with the prior art, for example, as disclosed in Japanese Patent Laid-Open No. Hei 2-5122. The mouse unit comprises an X-axis encoder 11a for generating pulses XA and XB in the X-axis direction, a Y-axis encoder 11b for generating pulses YA and YB in the Y-axis direction, a ball 12 for transmitting the motion of the mouse to the encoders 11a and 11b, an X-axis counter 14a, a Y-axis counter 14b, a landing detector 13, a data register 15 for holding counts from the counters 14a and 14b, an auxiliary register 16, a transmission buffer 17, and a control circuit 18 responsive to a signal from the landing detector 13 to control the counters 14a, 14b, the data register 15, the auxiliary register 16 and the transmission buffer 17. FIG. 2 is a flowchart illustrating the data controlling and processing procedure of the mouse unit.

When the mouse is moved on a plane surface, the ball 12 is rotated. The rotation of the ball 12 is divided into X- and Y-axis components by the X- and Y-axis encoders 11a and 11b, respectively. The X- and Y-axis encoders 11a, 11b generate pulses for each constant movement of the mouse. Pulses XA and YA are generated by the respective encoders when the mouse is moved in the positive direction while pulses XB and YB are produced by the respective encoders when the mouse is moved in the negative direction. The pulses XA and XB are counted by the X-axis counter 14a while the pulses YA and YB are counted by the Y-axis counter 14b. Counts in each of the counters are cleared by the control circuit 18 at a given time interval. X- and Y-axis movement ($\Delta X$, $\Delta Y$) of the mouse for the time interval are inputted into the data register 15 and outputted therefrom through the auxiliary register 16 and transmission buffer 17. A signal from the landing detector 13 in the mouse is sent to the control circuit 18 and used in control of the output data. The processing procedure triggered by the signal from the landing detector 13 will be described with reference to FIG. 2.

In FIG. 2, the movement data ($\Delta X$, $\Delta Y$) of the mouse is taken in the system at S91. The system also checks at S92 whether or not the mouse is in its landing position. If the mouse is in its landing position, the movement data ($\Delta X$, $\Delta Y$) is stored in the auxiliary register 16 at S93 and transferred to the transmission buffer 17 at S94. If the mouse is not in its landing position, the value of the auxiliary buffer 16 is transferred to the transmission buffer 17 at S96. The transmission buffer 17 outputs the data at S95.

FIG. 3 shows another plane contact detection type mouse unit constructed in accordance with the present invention, for example, as disclosed in Japanese Patent Laid-Open No. Sho 63-79128. The mouse unit comprises a mouse body 1, a reception buffer 22, a selector 23, a comparator 24, a holding circuit 25, a transmission buffer 26 and a system device 27.

In the mouse unit of FIG. 3, if the button switch of the mouse is not depressed, the data of the mouse flows from the reception buffer 22 through the selector and transmission buffer 23, 26 to the system device 27. Thus, the movement of the mouse can be transmitted directly to the system device 27. At this time, the holding circuit 25 is cleared.

When the mouse button is depressed, it generates a signal 28 which in turn is used to switch the selector 23 so that the signal itself will be inputted into the comparator 24. At the comparator 24, the signal is compared with the value of the holding circuit 25. The comparator 24 outputs that one of the values whose absolute value is larger than the other.

The mouse unit described by Japanese Patent Laid-Open No. Hei 2-5122 must have the landing detector mounted in the mouse body to judge whether or not the mouse is in contact with the plane surface. The mouse unit disclosed in Japanese Patent Laid-Open No. Sho 63-79128 is very complicated in operation since an operator is required to indicate the state of the mouse by actuating a switch.

If the mouse is separated from the plane surface, the prior art transmits a certain fixed value directly to the system device. Therefore, the prior art could not change data depending on the application or user's taste.

SUMMARY OF THE INVENTION

It is therefore an object of the present invention to provide a method of detecting the contact of a mouse with a plane surface from output data of movement in the mouse without instruction of an operator relating to whether or not the mouse is in contact with the plane surface, even if the mouse does not include a landing detector. Another object of the present invention is to provide a mouse control apparatus which uses the above method to control a cursor.

To this end, the present invention provides a method of detecting the contact of a mouse with a plane surface, comprising the steps of processing the movement data output from the mouse with its inherent characteristic values previously stored to estimate the time when the speed of movement in the mouse becomes zero; storing the results of estimation; retrieving the stored results when the data of movement from the mouse is zero; and detecting the contact of the mouse with the plane surface on the results obtained by the retrieving step.

The present invention also provides a mouse unit comprising movement detector means for detecting the movement of the mouse to generate output movement data; receiver means for receiving the movement data; characteristics holding means for previously storing characteristic values inherent in the mouse; and processor means for processing the movement data with the characteristic values to estimate the time when the movement of the mouse becomes zero and for storing the results of estimation with the received movement data, whereby when the received movement data becomes zero, the data stored in the processor means can be retrieved to detect the separation of the mouse away from the plane surface and the movement data stored corresponding to the results of estimation can be outputted from the processor means.

The present invention further provides a mouse unit comprising movement detector means for detecting the movement of the mouse to generate output movement data;

receiver means for receiving the movement data; characteristics measuring means for measuring characteristic values inherent in the mouse from the movement data from the receiver means; characteristic holding means for previously storing the characteristic values; and processor means for processing the movement data with the characteristic values to estimate the time when the movement of the mouse becomes zero and for storing the results of estimation with the received movement data, whereby when the received movement data becomes zero, the data stored in the processor means can be retrieved to detect the separation of the mouse away from the plane surface and the movement data stored corresponding to the results of estimation can be outputted from the processor means.

BRIEF DESCRIPTION OF THE DRAWINGS

FIG. 6 is a table illustrating a processing unit usable in the present invention.

FIG. 18 is a storage table showing updated movement data.

FIG. 19 is a storage table showing updated movement data.

FIG. 20 is a storage table showing updated movement data.

FIG. 21 is a storage table showing updated movement data.

FIG. 22 is a storage table showing updated movement data.

FIG. 23 is a storage table showing updated movement data.

FIG. 24 is a storage table showing updated movement data.

FIG. 25 is a storage table showing updated movement data.

DETAILED DESCRIPTION OF THE PREFERRED EMBODIMENTS

Figure 1:
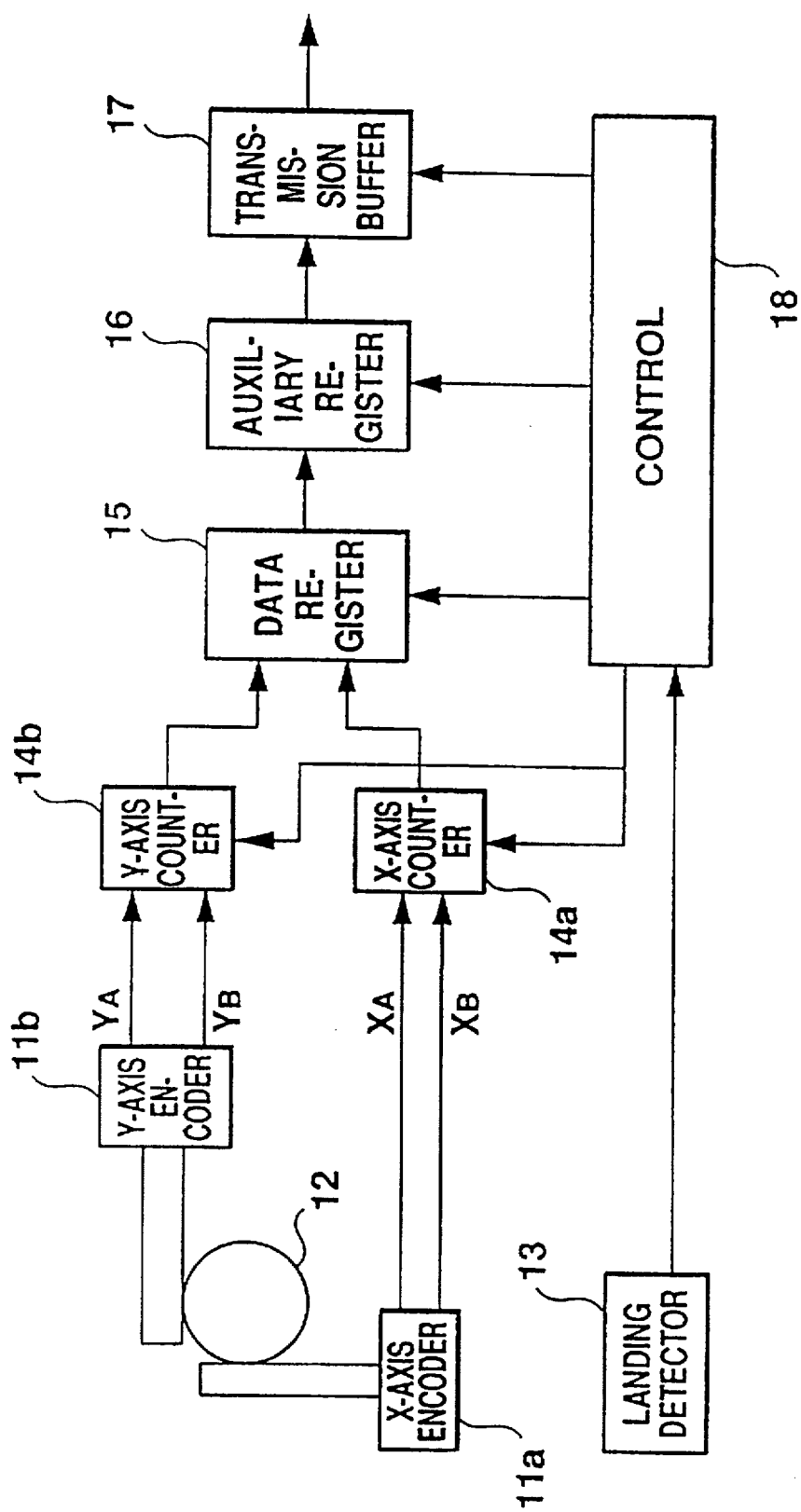
FIG. 1 is a block diagram illustrating a plane contact detection type mouse unit constructed in accordance with the prior art.
Figure 2:
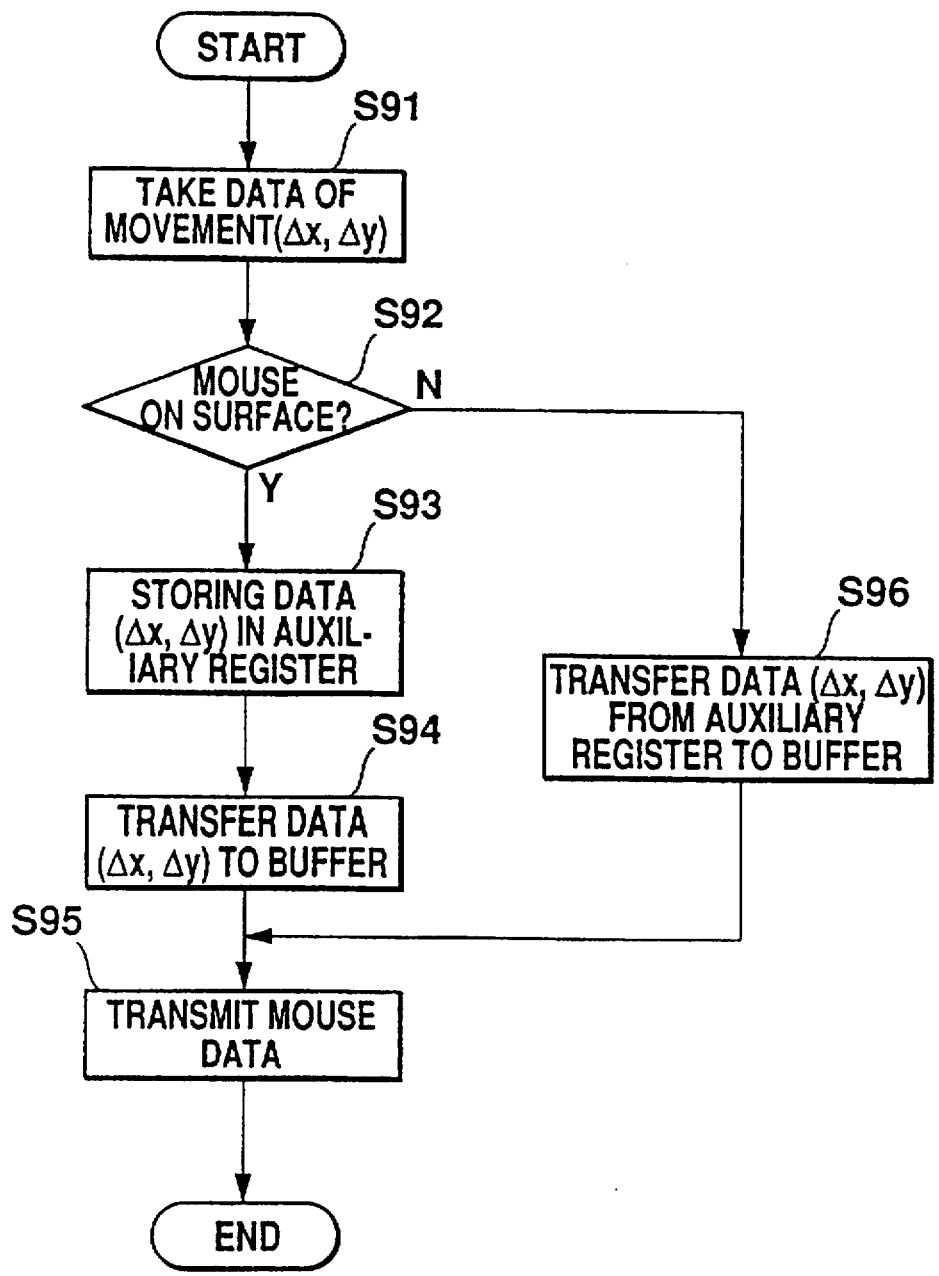
FIG. 2 is a flowchart illustrating the procedure of processing in the mouse unit of FIG. 1.
Figure 3:
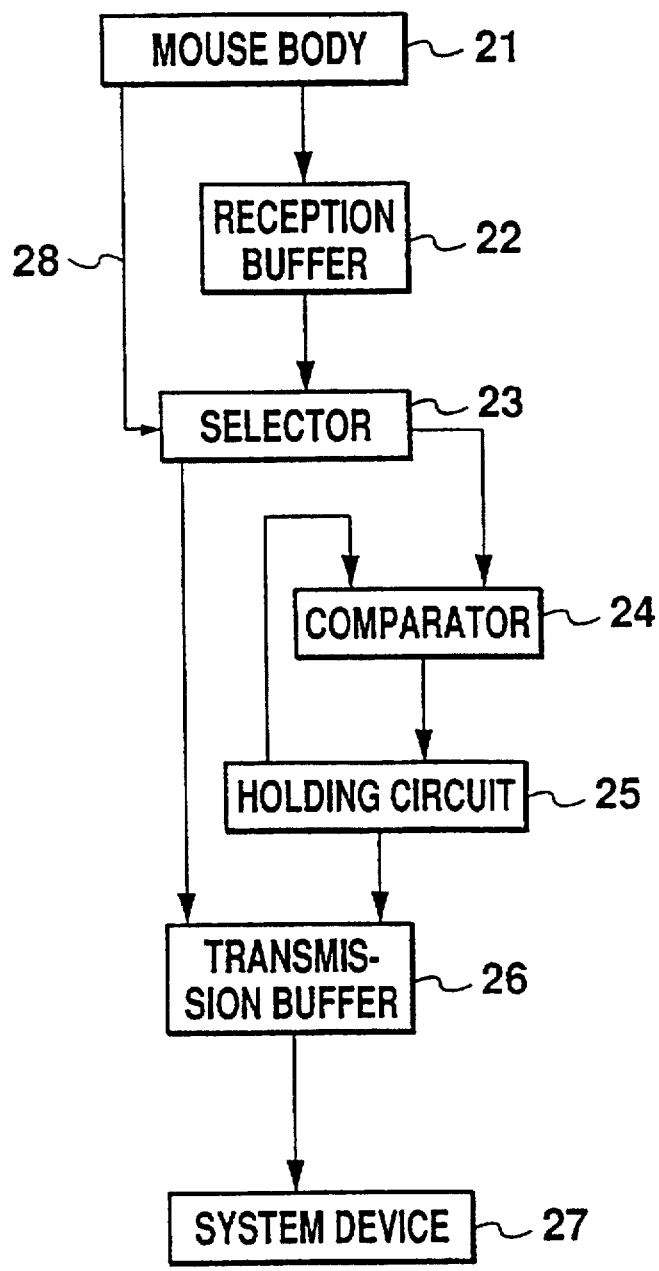
FIG. 3 is a block diagram illustrating another plane contact detection type mouse unit constructed in accordance with the prior art.
Figure 4:
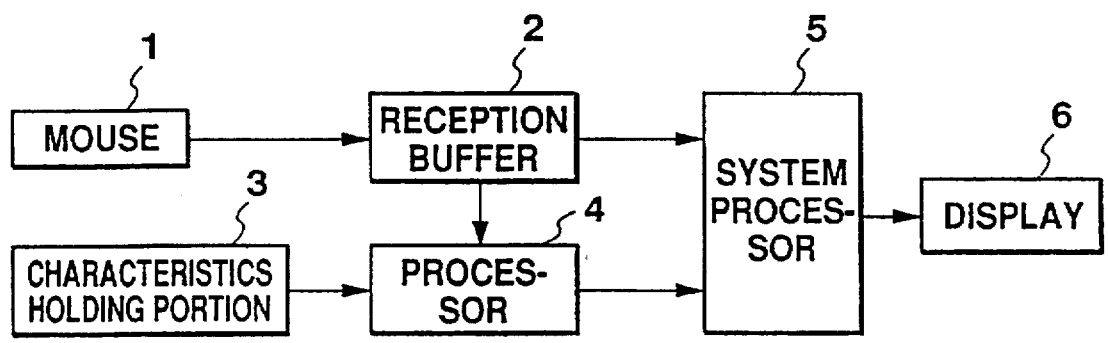
FIG. 4 is a block diagram illustrating the first embodiment of a mouse unit constructed in accordance with the present invention.

Referring first to FIG. 4, there is shown the first embodiment of a mouse unit constructed in accordance with the present invention, which comprises a mouse body 1, a reception buffer 2 for receiving mouse movement data ($\Delta x$, $\Delta y$) that is sampled at a given sampling interval tS, a characteristics holding portion 3 for previously holding characteristic values inherent in the mouse, a processing portion 4 for processing the movement data ($\Delta x$, $\Delta y$) outputted from the reception buffer 2 with the characteristic values from the characteristics holding portion 3 to judge whether or not the mouse is in contact with a plane surface, a system processing portion 5 and a display portion 6.

On operation, when the mouse body 1 is moved, it outputs movement data ($\Delta x$, $\Delta y$) including X- and Y-axis speed components on the movement of the mouse. The data is in units of length per period of time such as meters per second (m/s). The movement data ($\Delta x$, $\Delta y$) is at once inputted and held in the reception buffer 2 and then sent to the system processing portion 5 wherein the data is processed to display and move a cursor on the display portion 6.

The movement data is also sent from the reception buffer 2 to the processing portion 4. The processing portion 4 processes the movement data ($\Delta x$, $\Delta y$) with the characteristic values inherent in the mouse that are read out from the characteristics holding portion 3, so as to estimate the time when the movement data becomes zero.

The characteristic values inherent in the mouse which have previously been held in the characteristics holding portion 3 will be described.

Figure 5A:
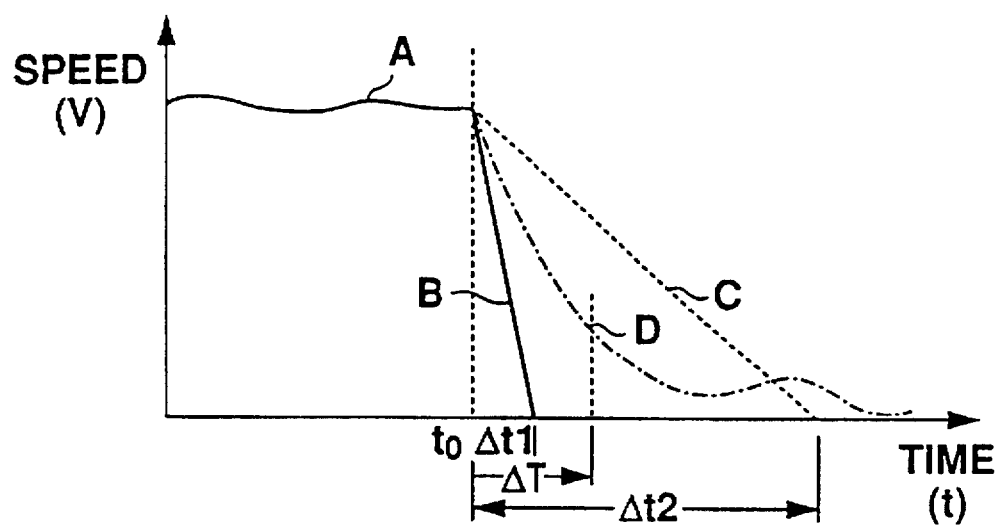
FIGS. 5A and 5B are graphs illustrating the characteristics of output data depending on the type of mouse.
Figure 5B:
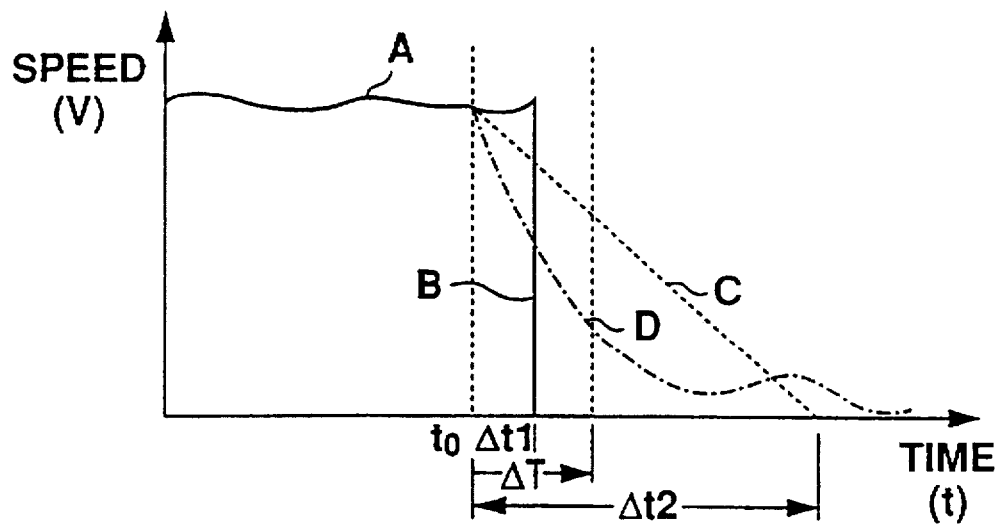

FIG. 5A shows the characteristics of a mechanical mouse, for example, that includes a rotary member and that the rotation of the rotary member is converted into output data relating to the speed of movement of the mouse. FIG. 5B shows the characteristics of an optical mouse.

Referring first to FIG. 5A, as the mouse is in contact with the top of a desk and being moved thereon, the mouse exhibits its characteristics of speed as in a region shown by A in FIG. 5A (which will be called "characteristics A" later). When the mouse is separated away from the top of the desk at time t0, the rotational speed of the rotary member is rapidly reduced due to the friction with the casing of the mouse, as in a region shown by B in FIG. 5A (which will is called "characteristics B" later). If the speed of movement of the mouse at the time t0 is assumed to be v0, the speed vt after t seconds becomes:

$$vt = v0 - \alpha 1 t,$$

resulting in zero speed after $\Delta t1$ where the value $\alpha$ is an acceleration. Hence, the value $\alpha$ is in units of length per period of time squared such as meters per second squared (m/s$^2$).

If the mouse is released from the hand of an operator and moved on the top of the desk at the time t0, the rotational speed of the rotary member is reduced due to the friction with the plane top of the desk, as in a region shown by C in FIG. 5A (which will be referred to "characteristics C" later). Similarly, the speed vt of the mouse after t seconds becomes:

$$vt = v0 - \alpha 2t,$$

resulting in zero speed after $\Delta t2$.

In general, the value $\alpha 1$ is substantially larger than the value $\alpha 2$. Thus, the relationship between the time and the speed is as shown by the characteristics B and C in FIG. 5A.

If the mouse is intended to be stopped at the time t0 while it is grasped by the operator's hand, the speed of the mouse is rapidly reduced as on separation of the mouse from the desk top. However, the speed of the mouse will not immediately be zero since the mouse is grasped by the operator's hand, as in a region shown by D in FIG. 5A.

Referring next to FIG. 5B, the optical mouse is adapted to emit light to a surface to be contacted by the mouse and to receive the light reflected by the surface to output data relating to the speed of movement. When the mouse is separated from the surface at time to and if the distance between the mouse and the surface is not largely changed, the mouse can detect the speed of the mouse as on contact of the mouse with the surface. As the above distance is increased (after $\Delta t1$), the mouse will not be able to detect the reflective light. Thus, the speed of the mouse suddenly becomes zero.

The characteristics B and C shown in FIGS. 5A and 5B depends on the type of mouse. If the characteristic values $\alpha 1$ and $\alpha 2$ representing the characteristics B and C are previously known, therefore, the time when the speed becomes zero can be estimated.

More particularly, the time period $\Delta t1$ until the speed becomes zero after the mouse is separated from the surface is $$\Delta t1 = v0/\alpha 1$$

while the time period $\Delta t2$ until the speed becomes zero after the mouse is released and moved on the surface is $$\Delta t2 = v0/\alpha 2.$$

If the value $\alpha$ is preset to be $\alpha 2 < \alpha < \alpha 1$, the time when the speed becomes zero can be estimated. An estimated time $\Delta T$ when the speed becomes zero will be in such a relationship as to be $\Delta t1 < \Delta T < \Delta t2$. By continuously determining whether or not the speed is equal to zero at the time $\Delta T$, it can be judged whether or not the mouse is on the surface.

The output data from the mouse is represented by a movement per unit time. If the unit time is relatively long, various apparent characteristics are detected to include the characteristics B shown in FIGS. 5A and 5B.

If the unit time is assumed to be $\Delta t$, the time $\Delta T$ can easily be set at which the speed necessarily becomes zero within a time period $2\Delta t$. By continuously determining whether or not the speed is equal to zero at $\Delta T$, it can be judged whether or not the mouse is on the surface.

The operation of the processing portion 4 will now be discussed in further detail. The processing portion 4 receives the characteristic value a of the mouse from the characteristics holding portion 3. Additionally, the processing portion 4 receives movement data $(\Delta x, \Delta y)$ from the reception buffer 2 periodically at times t=1, 2, 3, . . . . For each movement data $(\Delta x_t, \Delta y_t)$ received at time t, the processing portion 4 calculates an estimated time P which represents an estimation of when the processing portion 4 expects that the movement data $(\Delta x, \Delta y)$ will become zero (0,0):

$$P(t) = t + Q(\Delta x_t, \Delta y_t) \text{ where}$$

$$P(t) = t + Q(\Delta x_t, \Delta y_t) \text{ where } Q(\Delta x_t, \Delta y_t) = \frac{(\Delta x_t^2 + \Delta y_t^2)^{\frac{1}{2}}}{\alpha}.$$

It should be clear that P(t) is in units of a period of time such as seconds (s) since both $\Delta x_t$ and $\Delta y_t$ are velocities (m/s) and $\alpha$ is an acceleration (m/s$^2$).

The processing portion 4 rounds up each estimated time P(t) and stores it in a table with its respective time t and its movement data $(\Delta x_t, \Delta y_t)$ as shown in FIG. 6. When the movement data is equal to zero, i.e., $(\Delta x_t, \Delta y_t) = (0,0)$, the processing portion 4 compares the value of t (i.e., the current value of t associated with the movement data being equal to zero) with the last stored P, i.e., P(t−1) in the table. If, P(t−1) does not equal the current value of t, the processing portion 4 concludes that the mouse is still in contact with the surface. If, however, P(t−1) equals the current value of t, the processing portion 4 concludes that the mouse is not in contact with the surface.

When the processing portion 4 concludes that the mouse is no longer in contact with the surface, the processing portion 4 continues to check previous values of P, i.e., P(t−2), P(t−3), . . . until P no longer equals the current value of t, i.e., until P(t−n) does not equal t, where n=2, 3, . . . . Then, the processing portion sends the movement data $(\Delta x, \Delta y)$ associated with P(t−n+1) to the system processing portion 5. In this way, the system processing portion 5 may continue to the move the cursor on the display 6 according to the movement data $(\Delta x_{t-n+1}, \Delta y_{t-n+1})$ received from the processing portion even though the mouse is no longer on the surface.

The cursor may be stopped when the mouse is returned to the surface. For instance, the redetection of a signal by an optical mouse or a detection of movement (i.e., $(\Delta x, \Delta y)$ does not equal (0,0)) may cause the processing portion 4 to stop sending movement data to the system processing portion 5.

The above process will be described in more detail with to FIGS. 6 and 7. A storage table shown in FIG. 6 is a table of depth 7 and includes storage areas at estimated times P(t), at each of which the movement data (D(x), D(y)) at each sampling becomes zero.

Practical example of the operation of the system processor 5:

To simplify the description, it is assumed that $\Delta Y$ is always zero (0) but only $\Delta X$ is variable, and $\alpha = 3$. Further, it is assumed that an initial mouse pointer position (X, Y) is (100, 100). T represents time.

1. Operation at time T=1

Figure 12:
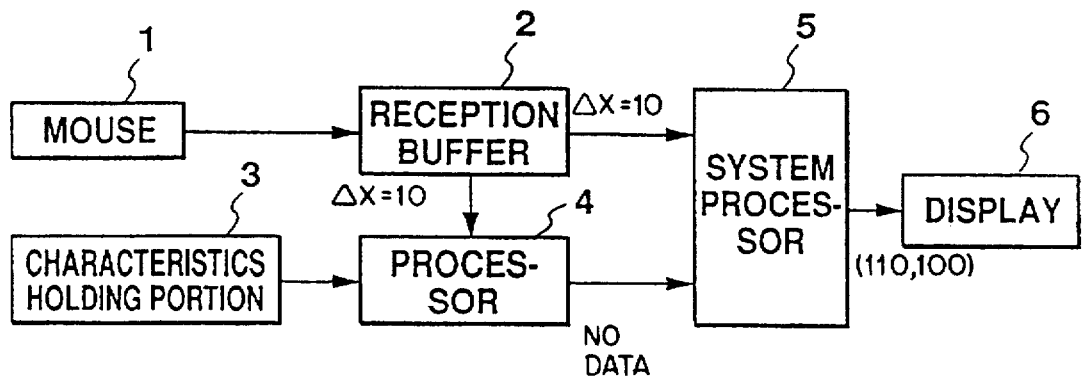
FIG. 12 is a block diagram showing the operation of the first embodiment.

(1) The movement data $\Delta X$ of the mouse is 10. As shown in FIG. 4, the reception buffer 2 receives the movement data from the mouse 1. The movement data $(\Delta X, \Delta Y)$ is sent to the processor 4 and the system processor 5 as shown in FIG. 12.

Figure 7:
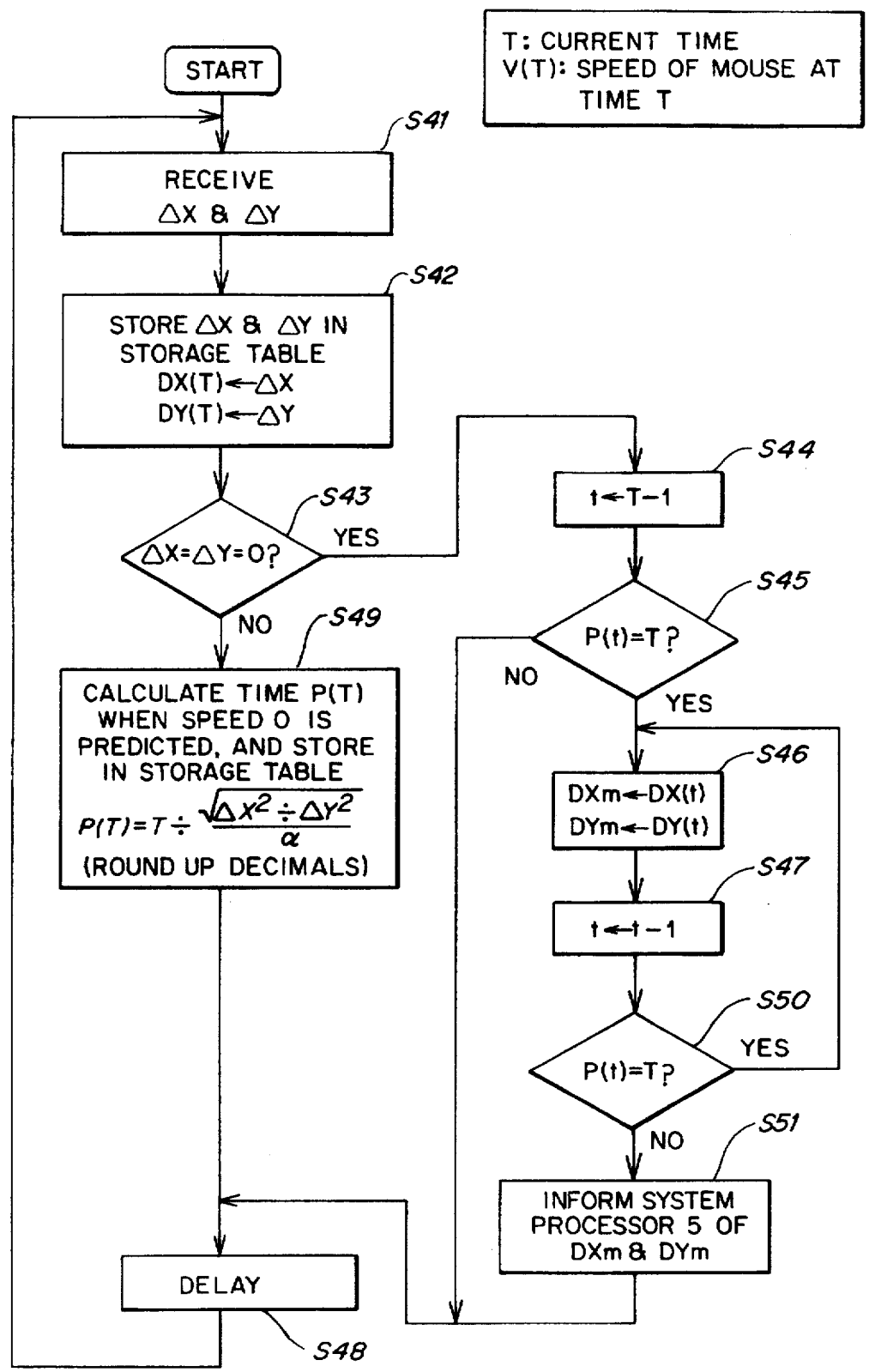
FIG. 7 is a flowchart illustrating the procedure of processing in the mouse unit shown in FIG. 4.

(2) The operation of the processor 4 receiving the movement data is shown in FIG. 7. The movement data is processed according to the procedure shown in FIG. 7. In step S41, the movement data $(\Delta X, \Delta Y)$ is received, and is written in the table in step S42. The storage table is updated as shown in FIG. 18. When it is not found that ΔX=ΔY=0 in step S43, the logic sequence advances to step S44. In step S44, P(T) is calculated $$P(1) = 1 + \left( \frac{(10)^2 + (0)^2}{3} \right)^{0.5} = 4.333 \approx 5,$$

and is written in the storage table. The storage table is updated as shown in FIG. 19. In this state, the processor 4 completes its operation for time T=1, and does not provide any data to the system processor 5.

Figure 11:
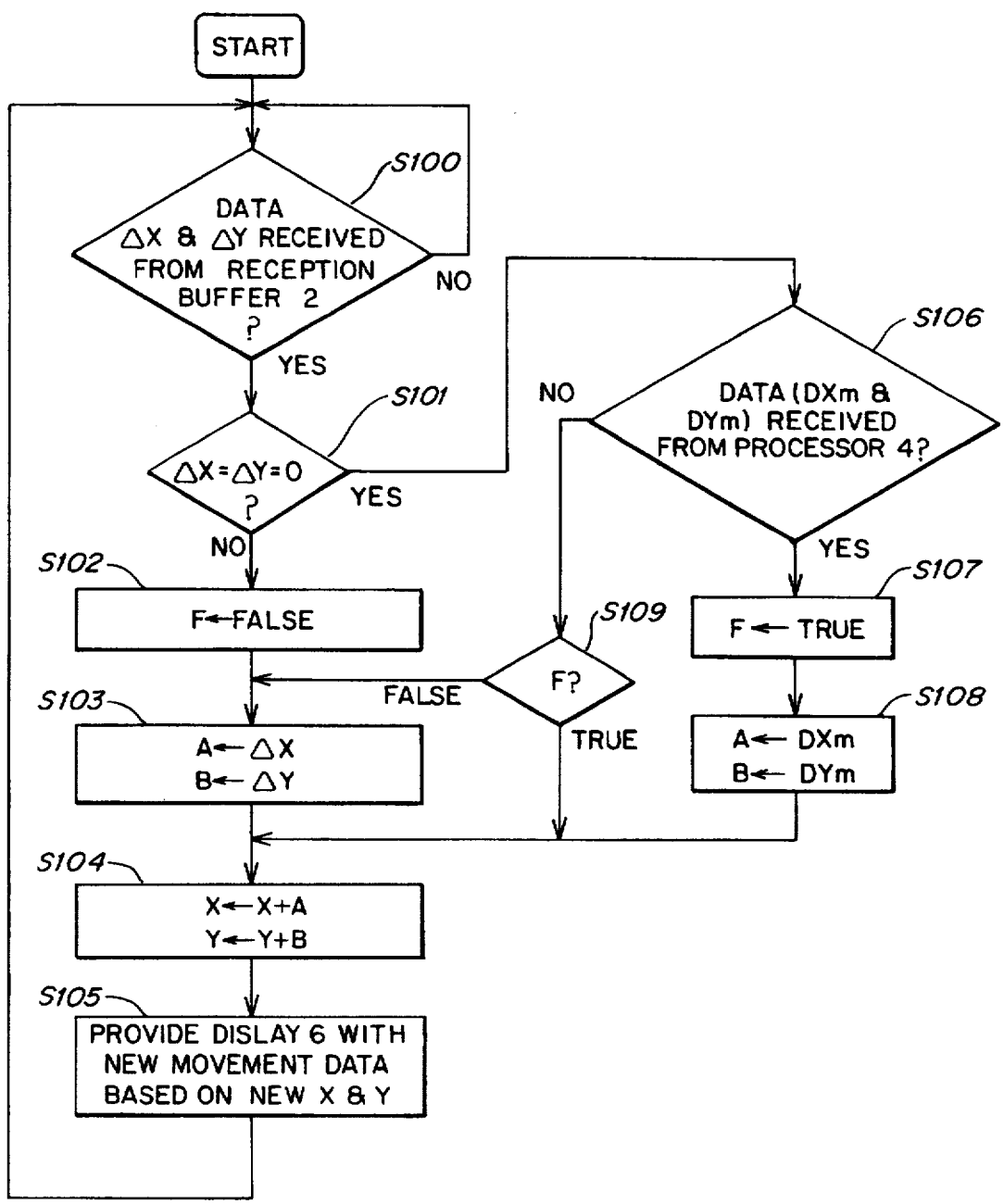
FIG. 11 is a flowchart showing the operation of the system processor 5.

(3) The system processor 5 performs its operation according to the procedure shown in FIG. 11. When T=1, the reception buffer 2 provides the data to the system processor 5. Then, the logic sequence advances to step S101. Since ΔX is neither ΔY nor 0, the logic sequence advances to step S102. In step S102, FALSE substitutes for F. In step S103, ΔX and ΔY substitute for A and B (where ΔX=10 and ΔY=0), respectively. In step S104, 110 (i.e., 100+10) and 100 (i.e., 100+0) substitute for X and Y, respectively. (X=110, Y=100) is forwarded to the display 6.

2. Operation from time T=2 to time T=5

It is assumed that DX(2)=13, DX(3)=6, DX(4)=8, DX(5)=7, and DY=0. After the same operation is in item 1 above, the storage table is updated as shown in FIG. 20.

3. Operation for time T=6

Figure 13:
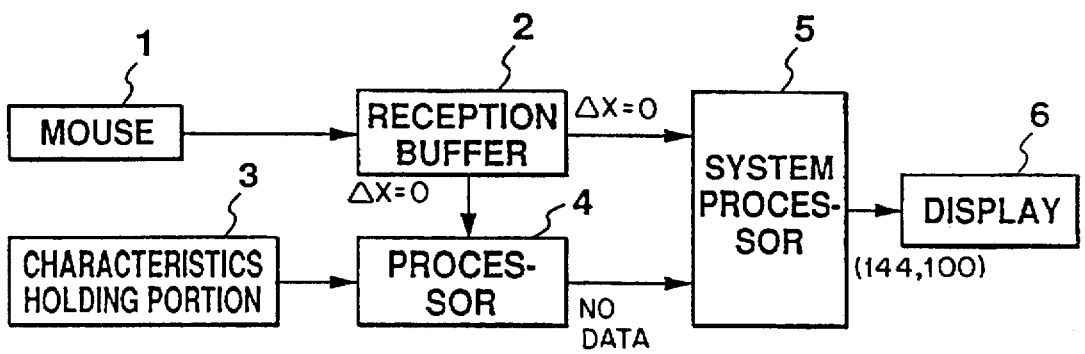
FIG. 13 is a block diagram showing the operation of the first embodiment.

(1) When the mouse happens to stop, the mouse 1 provides the movement data to the reception buffer 2. The movement data (ΔX, ΔY) is transferred to the processor 4 and the system processor 5 as shown in FIG. 13.

(2) The processor 4 operates according to the procedure shown in FIG. 7. In step S41, the movement data (ΔX, ΔY) is received, and is written into the storage table in step S42. The storage table is updated as shown in FIG. 21. Since it is found in step S43 that ΔX=ΔY=0, logic sequence advances to step S44. In step S44, 5 substitutes for t (i.e., t=T−1=6−1=5). In step S45, P(5) is found to be "8" which is not equal to current time T (i.e., 6). Then, the logic sequence advances to step S48 related to Delay. Thus, the processor 4 completes its operation for time T=6. No data is supplied to the system processor 5 from the processor 4.

(3) The system processor 5 performs its operation according to the procedure shown in FIG. 11. The reception buffer 2 provides data to the system processor 5. Thereafter, the system processor 5 begins to perform its operation in step S101. Since ΔX=0, and ΔY=0 in step S101, the logic sequence advances to step S106. In step S106, since no data arrives from the processor 4, the logic sequence advances to step S107. The flag F has been set to "FALSE" in step S107, so that the logic sequence advances to step S103. In step S103, Δx and Δy substitute for A and B, respectively (where ΔX=0 and ΔY=0). In step S104, 110 (i.e., 110+10) and 100 (i.e., 100+0) substitute for X and Y, respectively. (X, Y), i.e., (110,100) is forwarded to the display 6.

4. Operation for time T=7 and time T=8

During T=7 and T=8, it is assumed that DX(7)=10 and DX(8)=10 (DY=0 at both times). Following the same operation as in item 1 above, the storage table is updated as shown in FIG. 22.

5. Operation for time T=9, T=10 and T=11

At the time T=8, if the mouse moves away from the surface of a desk, DX(9)=8, DX(10)=5, DX(11)=2, and DX(12)=0. As described previously, α is assumed to be 3. The same operation as in item 1 is carried out according to the procedure mentioned above, so that the storage table will be updated as shown in FIG. 23.

6. Operation for time T=12

Figure 14:
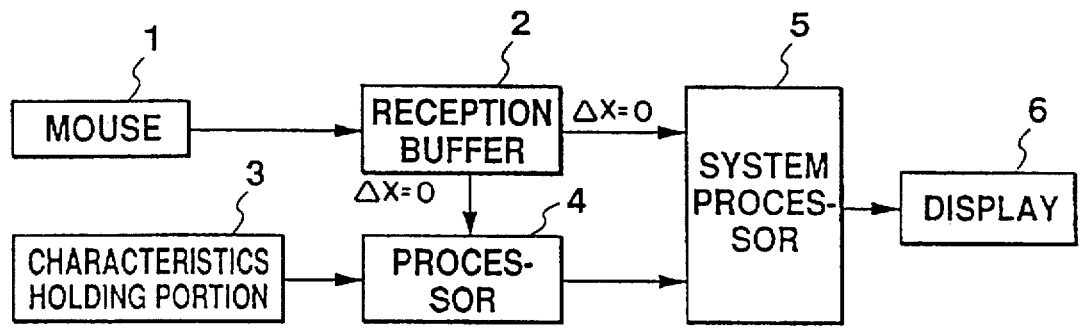
FIG. 14 is a block diagram showing the operation of the first embodiment.

(1) Since DX(12)=0 as described above, the reception buffer 2 receives the movement data from the mouse 1. The movement data (ΔX, ΔY) is supplied to the processor 4 and the system processor 5 as shown in FIG. 14.

The movement data is received in step S41. In step S42, the movement data (ΔX, ΔY) is written into the storage table. The storage table is updated as shown in FIG. 24.

Since ΔX=ΔY=0 in step S43, the logic sequence advances to step S44. In step S44, 11 substitutes for t (i.e., t=T−1=12−1).

In next step S45, P(11)=12, which is equal to current T (i.e., T=12). Therefore, the logic sequence advances to step S46, wherein "2" (i.e., DX(11)) and "0" (i.e., DY(11)) substitute for DXm and DYm, respectively.

In step S47, t is reduced by 1, so that 10 is stored in t (i.e., t=T−1=11−1).

Since P(10)=12 in step S50, and is equal to present T (i.e., T=12), the logic sequence advances to step S46.

The processing involving steps S46, S47 and S50 is repeated until the requirement P(t)=T is not satisfied. When t is 7, P(7)=11 in step S50. Since "11" is not equal to current T (i.e., T=12), the logic sequence advances to step S51.

In step S51, (DXm, DYm) is notified to the system processor 5 (where DXm=10 and DYm=0).

Step S48 relates to the time delay, in which the processing is delayed for a given period of time. Thus, the processor 4 completes its operation for T=12.

(3) The system processor 5 performs its operation according to the procedure shown in FIG. 11. When T=12, the reception buffer 2 provides the movement data to the system processor 5. Receiving the movement data in step S100, the system processor 5 proceeds with the operation in step S101. Since ΔX=ΔY=0 in step S101, the logic sequence advances to step S106.

Since the movement data is present, the logic sequence advances to step S107, wherein "TRUE" substitutes for F.

In step S108, DXm and DYm substitute for A and B, respectively (where DXm=10 and DYm=0).

Figure 15:
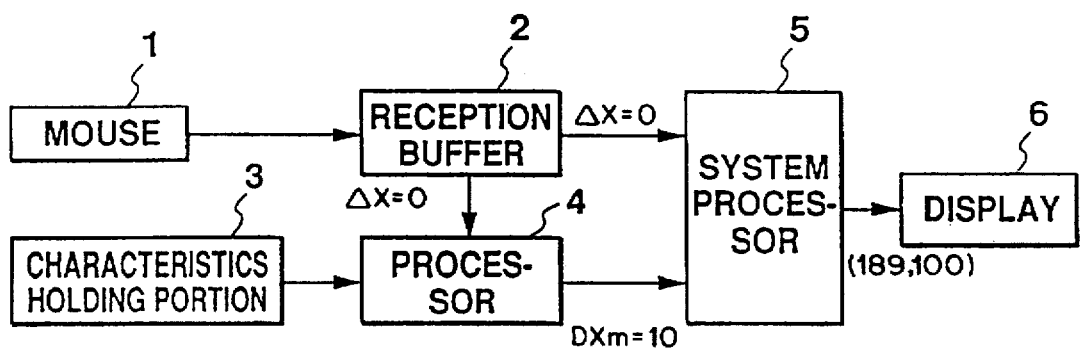
FIG. 15 is a block diagram showing operation of the first embodiment.

In step S104, 189 (i.e., 179+10) and 100 (i.e., 100+0) substitute for X and Y, respectively. In step S105, (X, Y) is provided to the display 6 (where X=189 and Y=100). The foregoing operation is shown in FIG. 15.

Figure 16:
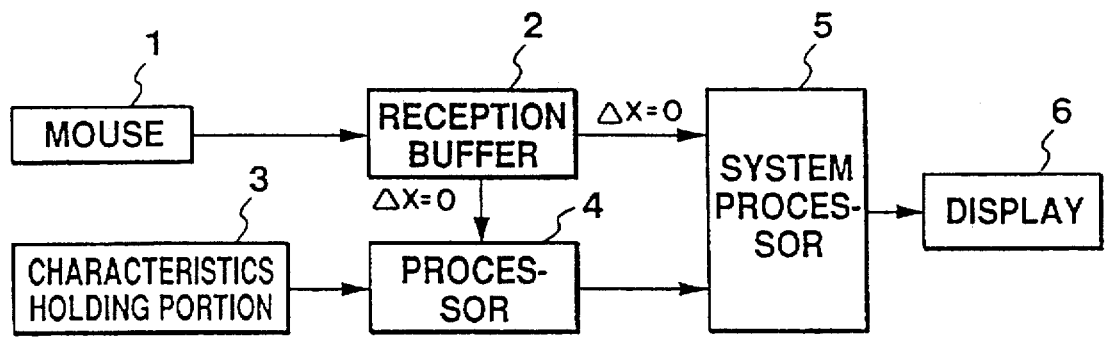
FIG. 16 is a block diagram showing the operation of the first embodiment.

7. Operation to be performed while the mouse is in the air:

(1) During time T=13 and T=14, the mouse is in the air. No movement of the mouse in the air is detected, so that DX(13)=DX(12)=0. Receiving the movement data from the mouse 1, the reception buffer 2 provides it to the processor 4 and the system processor 5 as shown in FIG. 16.

(2) Receiving the data, the processor 4 performs its operation according to the procedure shown in FIG. 7. In step S41, the movement data is received. The movement data (ΔX, ΔY) is written into the storage table in step S42. Accordingly, the storage table is updated as shown in FIG. 25. Since ΔX=ΔY=0 in step S43, logic flow advances to step S44.

In step S44, 12 substitutes for t (i.e., t=T−1=13−1). P(12)=null (i.e., 0) in step S45, which is not equal to current T (i.e., T=13). Thus, nothing is notified to the system processor 5, so that logic sequence advances to step S48, wherein the operation is delayed for the given period of time. Then, the processor 4 completes its operation.

(3) The system processor 5 performs the operation according to the procedure shown in FIG. 11. For T=13 and T=14, the reception buffer 2 provides the movement data to the system processor 5. In the system processor 5, the logic sequence advances to step 101 from step S100. In step S101, since ΔX=ΔY=0, the logic sequence advances to step S106.

Since no movement data arrives from the processor 4 in step S106, the logic sequence advances to step S107.

In step S107, the flag F retains the value ("TRUE") described in item 6 above, so that the logic sequence advances to step S104.

In step S104, since A and B retain the values described in item 6, X and Y are 199 (i.e., 189+10) and 0 (i.e., 100+0), respectively, on the basis of A=10 and B=0.

Figure 17:
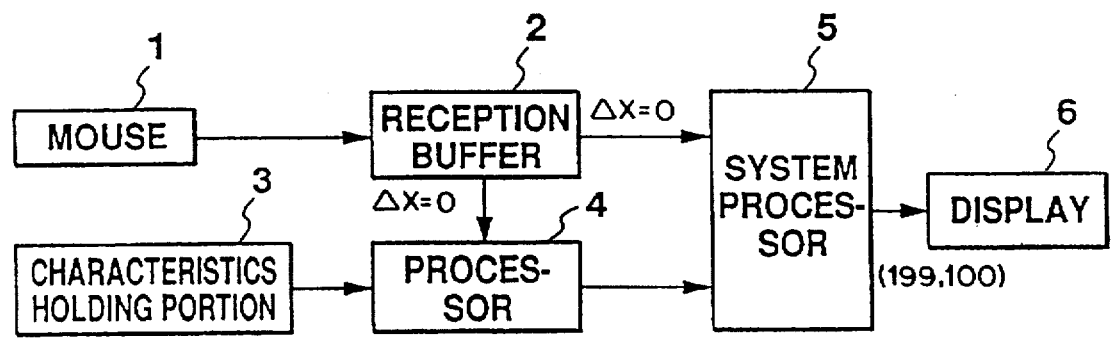
FIG. 17 is a block diagram showing operation of the first embodiment.

In step S105, (X,Y) is forwarded to the display 6 as shown in FIG. 17 (where X=199 and Y=100).

(4) At T=14, (X, Y) is sent to the display 6 in the similar manner as described above (where X=209 and Y=100).

In the first embodiment, the time at which the movement data (D(x), D(y)) becomes zero has been computed and estimated. However, the number of samplings may be computed. More particularly, it may be computed how many samplings are required until the speed becomes zero. It will be stored in the table.

Although the first embodiment has been described such that if there are estimated times equal to each other, an estimated time at which the speed of movement is larger is outputted to the system processing portion, an averaged movement from the same estimated times may be outputted to the system processing portion.

In the first embodiment, the characteristics holding portion 3 has previously stored the characteristic values depending on the type of mouse. However, the characteristics of a mouse connected to the system are measured, with the measurements being used to control the mouse.

The characteristic value a is set according to how fast the operator wishes to view the cursor moving in the display. If the operator is dissatisfied with the speed at which the cursor is moving, i.e., the cursor is moving too fast to handle or too slow, the operator may adjust the speed by setting the characteristic value α to a new value.

The characteristic value α is a predetermined value that may be entered into the characteristics holding portion 3 directly as a number by an operator. Alternatively, an embodiment of the invention may provide means for determining a characteristic value α. The means for determining the characteristic value α enables an operator to indirectly set the characteristic value a when the operator moves the mouse. The means for determining the characteristic value includes means for measuring movement data of the mouse, and means for calculating α from the measured movement data.

Figure 8:
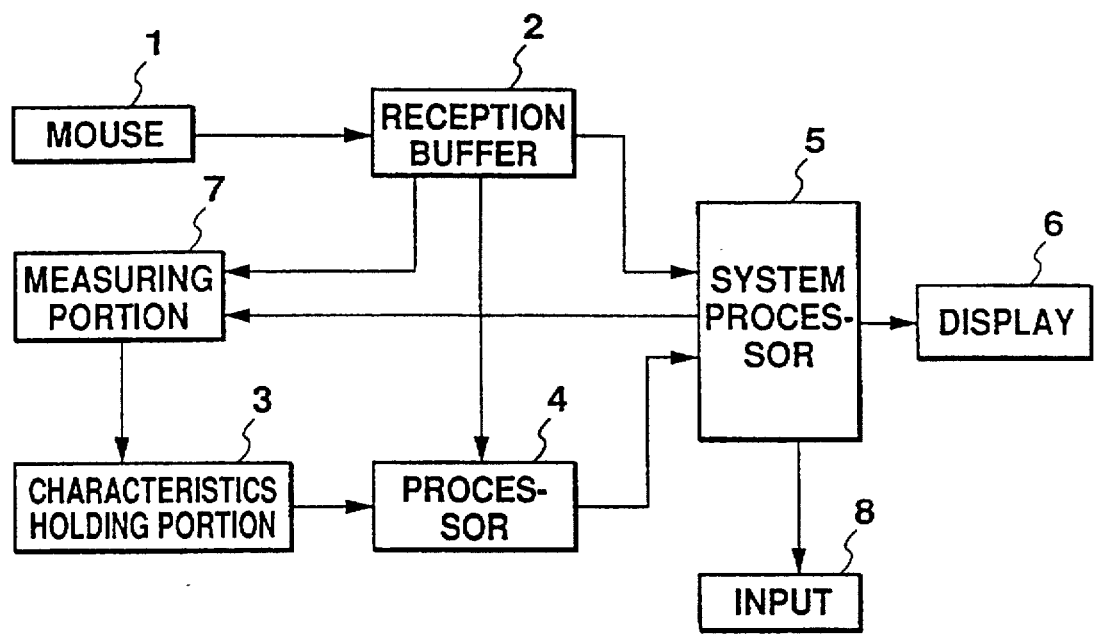
FIG. 8 is a block diagram of the second embodiment of a mouse unit constructed in accordance with the present invention.

FIG. 8 shows the second embodiment of a mouse unit constructed in accordance with the present invention. The second embodiment is different from the first embodiment only in that the mouse unit of the second embodiment further comprises an input portion 8 such as personal computer or the like and a measuring portion 7 responsive to a signal from the input portion 8 for measuring the characteristics of the mouse. The flowchart of FIG. 9 illustrates the operation thereof.

Referring to FIG. 8, the characteristic holding portion 3, the processor 4, the system processor 5 and the measuring portion 7 belong to different functional blocks, and some of them can be preferably realized according to the software program.

Figure 9:
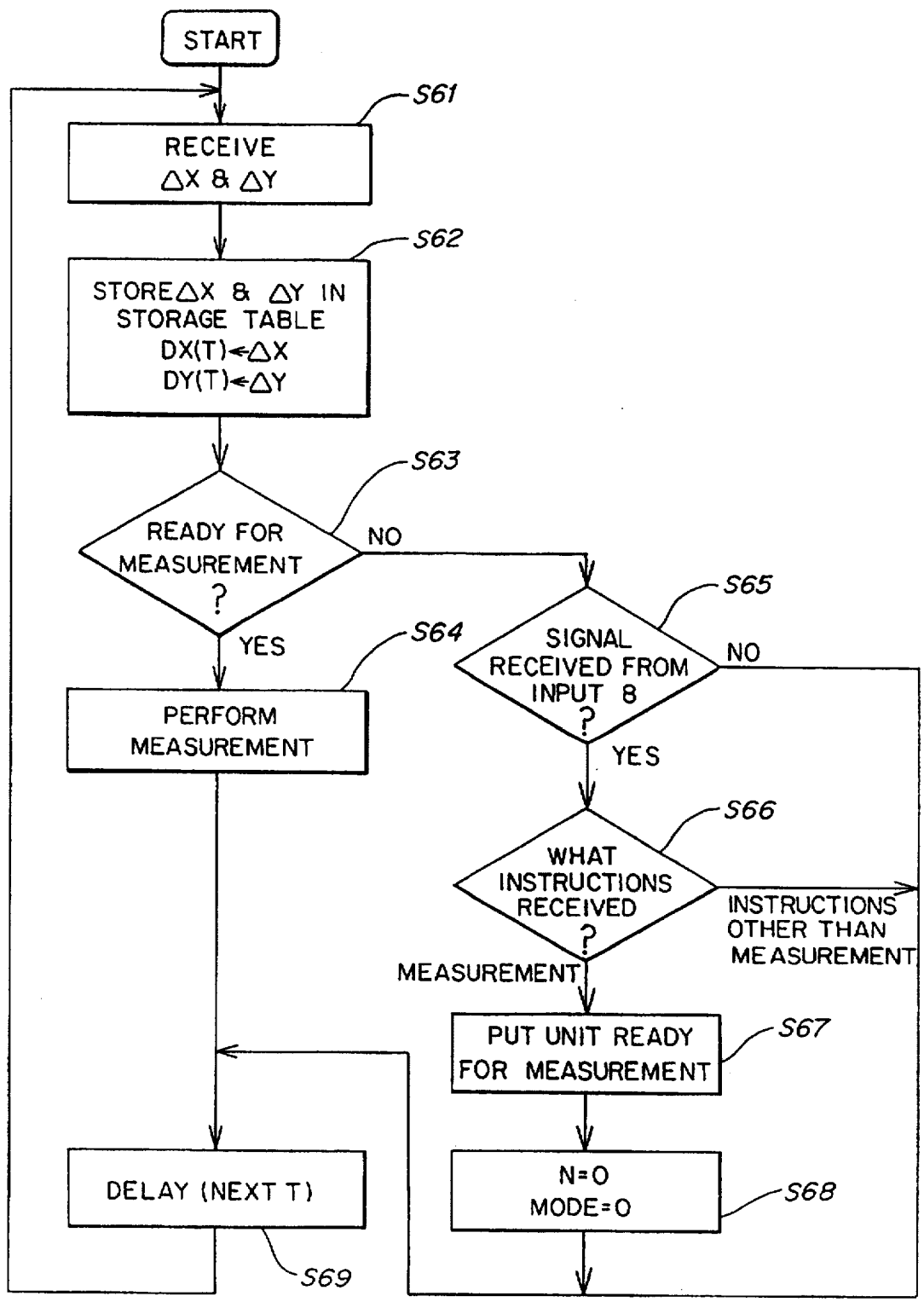
FIG. 9 is a flowchart illustrating the procedure of processing in the mouse unit of FIG. 8.

(1) FIG. 9 is a flowchart showing the operation of the system processor 5. Note that the system processor 5 is put into either the measurement mode or the non-measurement mode. Prior to the measurement, the movement data ΔX and ΔY is received from the reception buffer 2, and is respectively written into the storage tables DX(T) and DY(T) in step S62.

In step S63, a determination is made as to whether the system is ready for the measurement. When the system is not ready, the logic sequence advances to step S65, wherein the presence or absence of a signal from the input 8 is checked. When no signal is present, the logic sequence advances to step S69. In step S69, the operation is delayed for a given period of time so as to get ready for receiving succeeding data. Then, the logic sequence returns to step S61. In step S65, when there is a signal from the input 8, the logic sequence advances to step S66. In step S66, when the signal from the input 8 represents request for measurement, the logic sequence advances to step S67. Otherwise, the logic sequence advances to step S69. Then, the processor 5 is ready for processing data in a next cycle.

In step S67, the control device is put into the measurement mode. In step S68, both the counter N and the MODE are reset. Thus, the control device is ready for measurement. MODE represents the sub-status in the measurement mode. MODE=0 means the sub-status when the operator has not yet begun to slide the mouse in the measurement mode.

MODE=1 means the sub-status from the beginning of sliding the mouse until the ball in the mouse stops rolling while it is in the air.

MODE=2 means the sub-status waiting for the operators decision as to whether to continue measurement or not, after completion of physical measurement.

(2) In the measurement state, the movement data ΔX and ΔY is received from the reception buffer 2 in step S61. In step S62, the movement data is written into storage tables DX(T) and DY(T). Since the control device has already been in the measurement mode, the logic sequence advances to step S64 from step S67.

Figure 26:
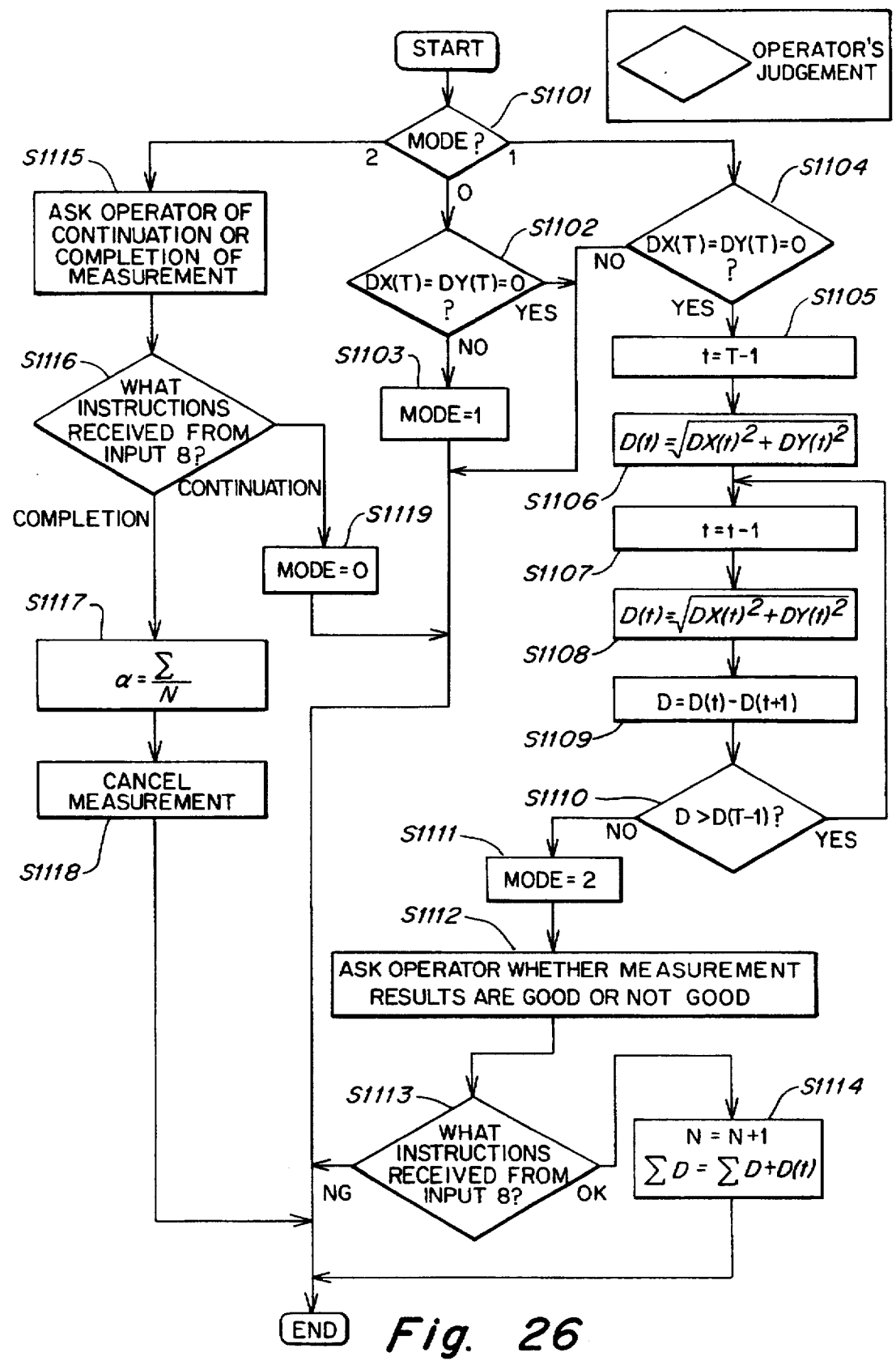
FIG. 26 is a flowchart showing the procedure to measure characteristics (acceleration) of a mouse.

(3) The following procedures are carried out during the measurement as shown in FIG. 26.

At the initial stage of the measurement, the MODE is checked in step S1101. Since the MODE=0, the logic sequence advances to step S1102.

In step S1102, a determination is made as to whether DX(T)=DY(T)=0. When the mouse remains stationary, the logic sequence advances to step END. Conversely, when the mousing is in movement, the logic sequence advances to step S1103. Even when the logic sequence returns to the procedure shown in FIG. 9 after step END, the measurement will be performed in step S64 after the procedure in steps S61 to S63. Then, the measurement will be performed following the procedure shown in FIG. 26. In step S1103, the MODE is set to 1.

Figure 28:
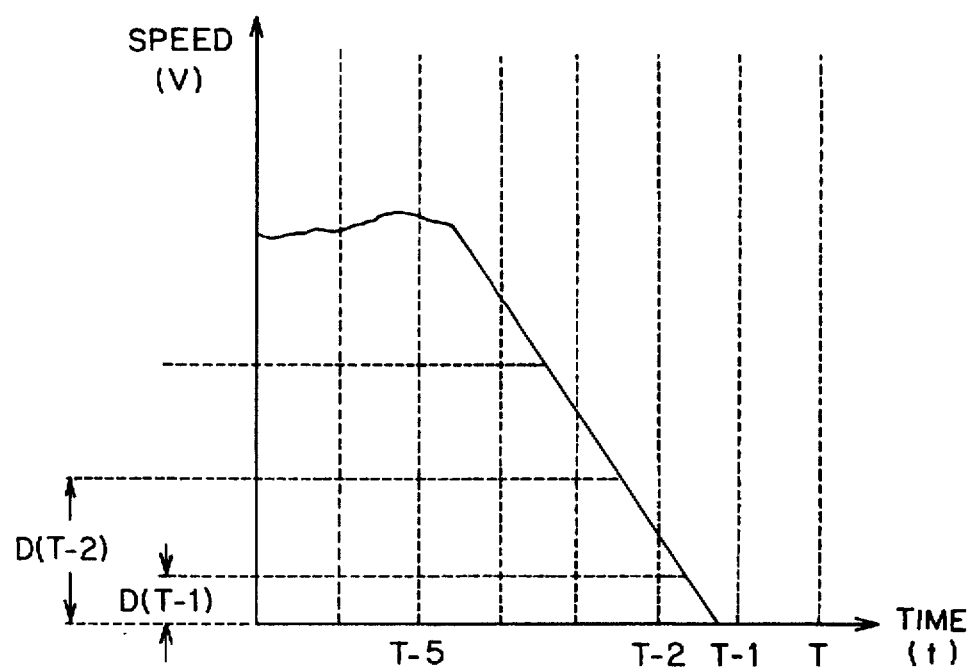
FIG. 28 is a graph showing movement of the mouse during the measurement of the characteristics of the mouse.

(4) After returning to the processing shown in FIG. 9, the measurement in step S64 will be started at a succeeding time T, and will be carried out according to the procedure shown in FIG. 26. In such a case, since the MODE=1 in step S1101, the logic sequence advances to step S1104. A determination is made as to whether DX(T)=DY(T)=0 in step S1104. In other words, when the mouse is in movement, the logic sequence advances to END. The following describes the processing when the mouse is found to be stationary after repeating the measurement in step S64 in FIG. 9 several times. It is assumed that the mouse is moving at speeds as shown in FIG. 28, where T represents current time. When the mouse becomes stationary, the MODE=1 in step S1101 shown in FIG. 26, and the logic sequence advances to step S1104.

In step S1104, it is confirmed that DX(T)=DY(T)=0. In other words, the mouse is stationary. Then, the logic sequence advances to step S1105.

In step S1105, T−1 substitutes for t, i.e. a time which is prior by one to the current time. In step S1106, the movement data (D(T−1)) at a time immediately prior to the time when the mouse stops moving, i.e. T−1 is calculated in step S1106.

t is reduced by one in step S1107. In other words, t is substituted by a value obtained by subtracting 2 from the current time T.

The movement data, at the time which is prior by one to the time when the movement data is obtained in step S1106, is calculated in step S1108.

In step S1109, D(t)−D(t+1) substitutes for D (i.e., D=D(t)−D(t+1)=D(T−2)−D(T−1)). In other words, D is substituted by a value which is obtained by subtracting the movement data (at the time prior by one to the current time) from the movement data (at the time prior by two to the current time).

In step S1110, D and D(T−1) are compared. In this embodiment, D>D(T−1) initially, so that the logic sequence advances to step S1107. The foregoing processing enables calculation to be continued until a difference between the movement data for a previous time and the movement data for the current time becomes larger than the movement data immediately before the movement of the mouse stops (T−1). If, for example, t=T−5 after repeated calculation, the condition D>D(T−1) cannot be maintained, and the logic sequence advances to step S1111 following step S1110.

In step S1111, 2 substitutes for MODE.

In step S1112, the operator is asked to check whether current measurement is acceptable, i.e. to reply OK/NG. The operator's reply will be entered in step S126 to be described later.

When the operator notifies OK in step S1114, the logic sequence advances to step S1114. In the case of NG, the current movement data is discarded, and a new measurement procedure will be restarted. In step S1114, N is incremented (i.e. one is added), and D(5) is added to ΣD.

(6) After D(t) is added to ΣD, the logic sequence returns to the processing shown in FIG. 9. After the given delay, the measurement will be resumed. In other words, at next time T, the succeeding processing will be performed. First of all, since MODE=2, the logic sequence advances to step S1115 from step S1101.

In step S1115, the operator is asked whether the measurement is to be continued or completed. The operator will respond to this in step S128 as will be described later. In step S1116, instructions from the input 8 are checked as to whether the measurement should be continued or completed. If the operator requests continuation (in step S128), the logic sequence advances to step S1119. Otherwise, logic sequence advances to step S1117.

In step S1119, 0 is set in MODE. Then, the logic sequence advances to END.

When the operator requests to complete the measurement, α is derived by dividing the total of D by the number of times N (i.e., α=ΣD/N).

In step S1118, the measurement process is canceled, so that the logic sequence advance to END.

Figure 27:
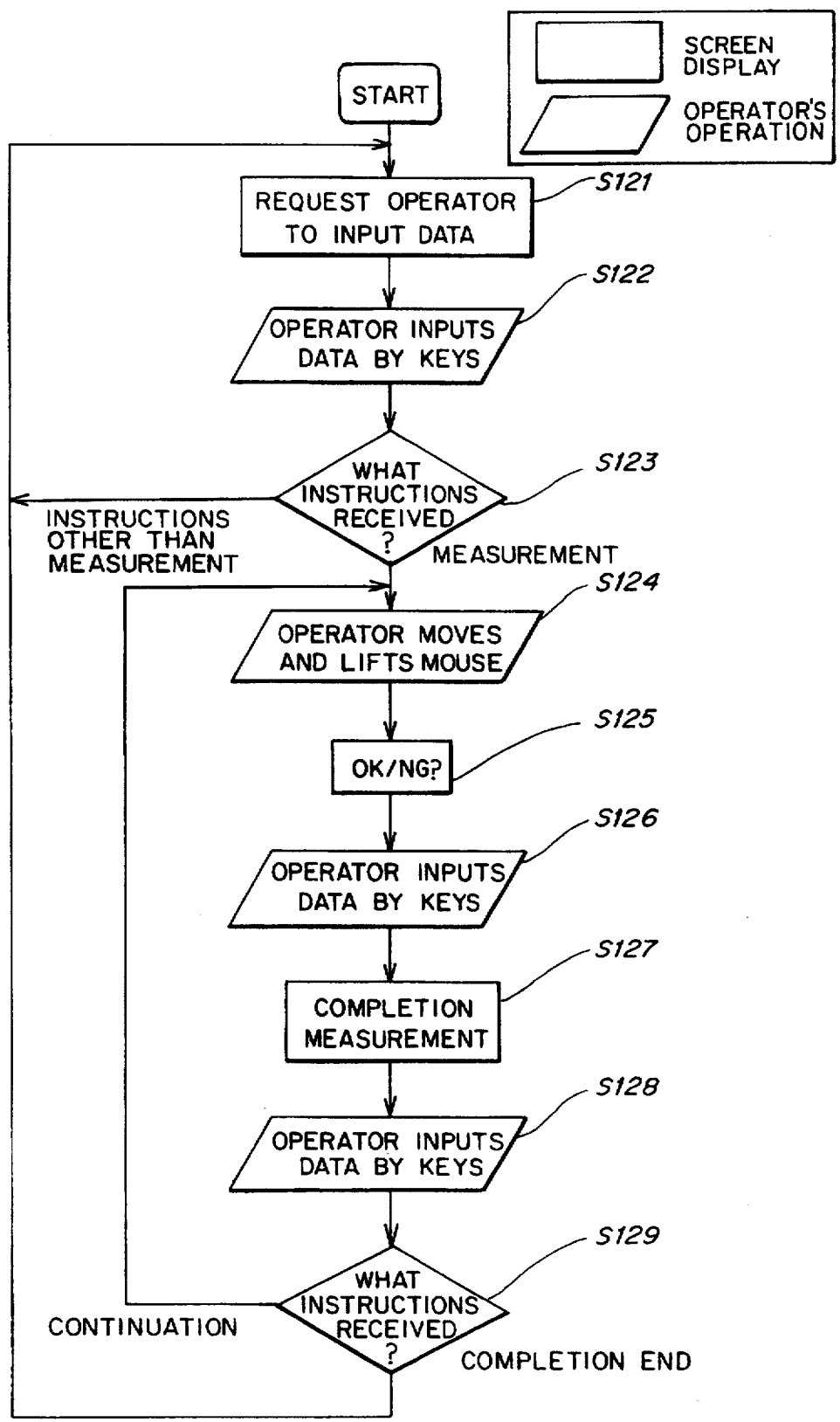
FIG. 27 is a flowchart showing the procedure in which the operators operation or determination is required so as to measure the characteristics (acceleration) of the mouse.

(7) Referring to the flowchart of FIG. 27, the operator's operation will be described when measuring α. In FIG. 27, rectangles denote indications given on the display, and parallelograms denote operations to be performed by the operator.

In step S121, request for data inputting is displayed. In step S122, the operator inputs data using keys in response to the data input request.

In step S123, it is checked whether the operator wishes to perform measurement or other operations. When the measurement is requested, the logic sequence advances to step S124. Otherwise, the logic sequence returns to step S121.

When the operator requests the measurement in step S123, the logic sequence advances to step S124. Then, the operator moves and lifts the mouse. In step S125, the device is notified whether the operator handles the mouse appropriately. In other words, "OK" or "NG" is displayed. In step S126, OK or NG is input by keys.

In step S127, it is asked whether measurement is to be continued or completed. In step S128, the operator operates keys to indicate continuation or completion. Either continuation or completion is checked in step S129. In the case of continuation, the logic sequence advances to step S124. Conversely, in the case of completion, the logic sequence returns to step S121. Thereafter, the foregoing process is restarted.

The second embodiment is different from the first embodiment and its modification in that the mouse of the second embodiment outputs the movement data based on previously stored functions.

Figure 10:
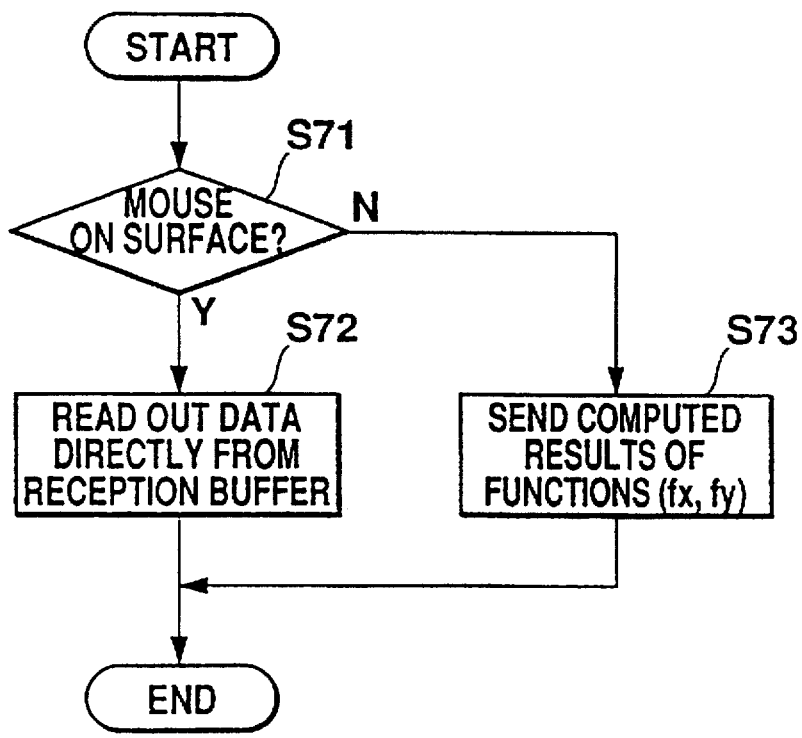
FIG. 10 is a flowchart illustrating the procedure of processing in another mouse unit according to the present invention.

Referring to FIG. 10, when the mouse is in contact with the plane surface, data is sent from the reception buffer 2 to the system processing portion 5 which in turn causes the display portion 6 to display a cursor. If it is judged that the mouse is not in contact with the plane surface, the movement data is computed and outputted by the use of functions (fx, fy) that have previously been stored or that can optionally be set.

For example, if the following previously stored functions are used, the motion of the cursor can be smoothed since it is assumed that the reduction of speed depends on a given friction:

$$fx(t)=vx0-\alpha x t;\text{ and}$$

$$fy(t)=vy0-\alpha y t$$

where vx0 and vy0 are speeds of the mouse on release.

Since the movement data necessarily becomes zero within a time period 2Δt if it is assumed that the unit time (measurement interval) is Δt, however, the measurement point ΔT can easily be set. When it is continuously determined whether or not the speed is equal to zero at the time ΔT, it can be judged whether or not the mouse is on the plane surface.

Since the present invention comprises the state detecting portion for holding the output characteristics of the mouse, the mouse unit of the present invention can detect the state of the mouse relative to the plane surface without the need of any particular device.

According to the present invention, further, if the mouse unit is not in contact with the plane surface, the output of the mouse is computed by the use of functions that take, as an initial speed, the speed of the mouse when the mouse unit is separated from the plane surface or any speed of the mouse. Therefore, the present invention can provide a user's interface which can freely be designed depending on the circumstances and application used therein.

Since the output characteristics of the mouse unit utilized by the state detecting portion of the present invention are automatically measured and stored on the operator's instruction, the present invention can easily provide any type of mouse unit that can detect the state of the mouse contacting the plane surface.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A computerized detection device for detecting when a mouse unit is no longer in contact with a surface, the device comprising:

means for receiving a series of mouse input signals;

means for providing a receive time associated with each of the series of mouse input signals;

means, coupled to the means for receiving and the means for providing, for storing a series of mouse data entries in a memory, each mouse data entry corresponding to one of the series of mouse input signals, each mouse data entry being stored when the corresponding one of the series of mouse input signals is received, and each mouse data entry including movement data defined by the corresponding one of the series of mouse input signals, the associated receive time, and a prediction time that is based on the associated receive time; and means, coupled to the means for storing, for comparing, when a mouse input signal indicates no movement of the mouse unit, prediction times of the series of mouse data entries stored in the memory to a receive time associated with the mouse input signal indicating no movement, determining whether the mouse unit is no longer in contact with the surface according to a result of a comparison between the prediction times and the receive time associated with the mouse input signal indicating no movement, and outputting an output signal when it is determined that the mouse unit is no longer in contact with the surface.

2. The device of claim 1, wherein the output signal includes movement data of a mouse data entry having a prediction time that matches the receive time associated with the mouse input signal indicating no movement.

3. The device of claim 2, further including:

means for providing mouse input signals to a display device when the mouse unit is in contact with the surface, and providing the output signal to the display device when the mouse unit is no longer in contact with the surface.

4. The device of claim 2, wherein the means for searching and outputting includes:

means for providing, to a display device, movement data of a most recently stored mouse data entry having a prediction time that matches the receive time associated with the mouse input signal indicating no movement if more than one mouse data entry has a prediction time that matches the receive time associated with the mouse input signal indicating no movement.

5. The device of claim 1, wherein the means for storing includes:

means for generating the prediction time of each of the mouse data values, each prediction time being generated according to a characteristic value $\alpha$, wherein the characteristic value $\alpha$ is a value defined by a user cursor movement preference.

6. The device of claim 1, wherein each mouse input signal includes an X-axis delta movement component $\Delta x$ and a Y-axis delta movement component $\Delta y$.

7. The device of claim 1, wherein the prediction time of each mouse data entry equals:

$$t + \frac{(\Delta x_t^2 + \Delta y_t^2)^{\frac{1}{2}}}{\alpha},$$

where t is the receive time, $\Delta x_t$ and $\Delta y_t$ are the movement data in units of velocity defined by the associated mouse input signal at receive time t, and $\alpha$ is a value in units of acceleration.

8. A cursor control system for controlling movement of a cursor, the system comprising:

a display device that displays the cursor;

a mouse unit that senses movement; and a processor, coupled between the mouse unit and the display device, that determines when the mouse unit is no longer in contact with a surface and sends a control signal to the display device to move the displayed cursor when the mouse unit no longer senses movement.

9. The system of claim 8, further including a memory coupled to the processor, and wherein the processor includes:

means for receiving a series of mouse input signals that define movement sensed by the mouse unit;

means for providing a receive time associated with each of the series of mouse input signals;

means for storing a series of mouse data entries in the memory, each mouse data entry corresponding to one of the series of mouse input signals, each mouse data entry being stored when the corresponding one of the series of mouse input signals is received, and each mouse data entry including movement data defined by the corresponding one of the series of mouse input signals, the associated receive time, and a prediction time that is based on the associated receive time; and means for comparing, when a mouse input signal indicates no movement of the mouse unit, prediction times of the series of mouse data entries stored in the memory to a receive time associated with the mouse input signal indicating no movement, determining whether the mouse unit is no longer in contact with the surface according to a result of a comparison between the prediction times and the receive time associated with the mouse input signal indicating no movement, and outputting an output signal to the display device when it is determined that the mouse unit is no longer in contact with the surface.

10. The system of claim 9, wherein the output signal includes movement data of a mouse data entry having a prediction time that matches the receive time associated with the mouse input signal indicating no movement.

11. The system of claim 10, wherein the processor further includes:

means for providing mouse input signals to the display device when the mouse unit is in contact with the surface, and providing the output signal to the display device when the mouse unit is no longer in contact with the surface.

12. The system of claim 10, wherein the means for searching and outputting includes:

means for providing, to a display device, movement data of a most recently stored mouse data entry having a prediction time that matches the receive time associated with the mouse input signal indicating no movement if more than one mouse data entry has a prediction time that matches the receive time associated with the mouse input signal indicating no movement.

13. The system of claim 9, wherein the means for storing includes:

means for generating the prediction time of each of the mouse data values, each prediction time being generated according to a characteristic value $\alpha$, wherein the characteristic value $\alpha$ is a value defined by a user cursor movement preference.

14. The system of claim 9, wherein each mouse input signal includes an X-axis delta movement component $\Delta x$ and a Y-axis delta movement component $\Delta y$.

15. The system of claim 14, wherein the prediction time of each mouse data entry equals:

$$t + \frac{(\Delta x_t^2 + \Delta y_t^2)^{\frac{1}{2}}}{\alpha},$$

where t is the receive time, $\Delta x_t$ and $\Delta y_t$ are the movement data in units of velocity defined by the associated mouse input signal at receive time t, and $\alpha$ is a value in units of acceleration.

16. A method of determining when a mouse unit is no longer in contact with a surface, the method including the steps of:
   A. receiving a series of mouse input signals;
   B. providing a receive time associated with each of the series of mouse input signals;
   C. storing a series of mouse data entries in a memory, each mouse data entry corresponding to one of the series of mouse input signals, each mouse data entry being stored when the corresponding one of the series of mouse input signals is received, and each mouse data entry including movement data defined by the corresponding one of the series of mouse input signals, the associated receive time, and a prediction time that is based on the associated receive time; and
   D. comparing, when a mouse input signal indicates no movement of the mouse unit, prediction times of the series of mouse data entries stored in the memory to a receive time associated with the mouse input signal indicating no movement, determining whether the mouse unit is no longer in contact with the surface according to a result of a comparison between the prediction times and the receive time associated with the mouse input signal indicating no movement, and outputting an output signal when it is determined that the mouse unit is no longer in contact with the surface.

17. The method of claim 16, wherein the output signal includes movement data of a mouse data entry having a prediction time that matches the receive time associated with the mouse input signal indicating no movement.

18. The method of claim 17, further including the step of:
   providing mouse input signals to a display device when the mouse unit is in contact with the surface, and providing the output signal to the display device when the mouse unit is no longer in contact with the surface.

19. The method of claim 17, wherein step D includes the step of:
   providing, to a display device, movement data of a most recently stored mouse data entry having a prediction time that matches the receive time associated with the mouse input signal indicating no movement if more than one mouse data entry has a prediction time that matches the receive time associated with the mouse input signal indicating no movement.

20. The method of claim 16, wherein step C includes the step of:
   generating the prediction time of each of the mouse data values, each prediction time being generated according to a characteristic value $\alpha$, wherein the characteristic value $\alpha$ is a value defined by a user cursor movement preference.

21. The method of claim 16, wherein each mouse input signal includes an X-axis delta movement component $\Delta x$ and a Y-axis delta movement component $\Delta y$.

22. The method of claim 21, wherein the prediction time of each mouse data equals:

$$t + \frac{(\Delta x_t^2 + \Delta y_t^2)^{\frac{1}{2}}}{\alpha},$$

where t is the receive time, $\Delta x_t$ and $\Delta y_t$ are the movement data in units of velocity defined by the associated mouse input signal at receive time t, and $\alpha$ is a value in units of acceleration.

23. A cursor control method for controlling movement of a cursor in a display device, the method comprising the steps of:
   A. determining when a mouse unit that senses movement is no longer in contact with a surface, and
   B. sending a control signal to the display device to move a displayed cursor when the mouse unit no longer senses movement.

24. The method of claim 23, wherein step A includes the steps of:
   receiving a series of mouse input signals that define movement sensed by the mouse unit,
   providing a receive time associated with each of the series of mouse input signals,
   storing a series of mouse data entries in a memory, each mouse data entry corresponding to one of the series of mouse input signals, each mouse data entry being stored when the corresponding one of the series of mouse input signals is received, and each mouse data entry including movement data defined by the corresponding one of the series of mouse input signals, the associated receive time, and a prediction time defined by the corresponding one of the series of mouse input signals and the associated receive time, and
   searching, when a mouse input signal indicates no movement of the mouse unit, the stored series of mouse data entries in the memory to find a mouse data entry having a prediction time that matches the receive time associated with the mouse input signal indicating no movement; and
   wherein step B includes the step of:
      outputting, to the display device, an output signal indicating that the mouse unit is no longer in contact with the surface if a mouse data entry is found in the step of searching.

25. The method of claim 24, wherein the output signal includes the movement data of the found mouse data entry.

26. The method of claim 25, further including the step of:
   providing mouse input signals to the display device when the mouse unit is in contact with the surface, and providing the output signal to the display device when the mouse unit is no longer in contact with the surface.

27. The method of claim 25, wherein the step of searching and outputting includes the step of:
   providing a most recently stored mouse data entry if more than one mouse data entry is found.

28. The method of claim 24, wherein the step of storing includes the step of:
   generating the prediction time of each of the mouse data values, each prediction time being generated according to a characteristic value $\alpha$, wherein the characteristic value $\alpha$ is a value defined by a user cursor movement preference.

29. The method of claim 24, wherein each mouse input signal includes an X-axis delta movement component $\Delta x$ and a Y-axis delta movement component $\Delta y$.

30. The method of claim 29, wherein the prediction time of each mouse data equals:

$$t + \frac{(\Delta x_t^2 + \Delta y_t^2)^{\frac{1}{2}}}{\alpha},$$

where t is the receive time, $\Delta x_t$ and $\Delta y_t$ are the movement data in units of velocity defined by the associated mouse input signal at receive time t, and $\alpha$ is a value in units of acceleration.

31. A system for controlling movement of a cursor, the system comprising:

a display device having a screen that displays the cursor in one of an array of coordinate positions;

a mouse that is movable on a surface and is removable from the surface, the screen displaying the cursor moving from a first coordinate position in a certain direction to a second coordinate position of the array of coordinate positions when the mouse moves on the surface;

means, coupled between the mouse and the display, for monitoring movement of the mouse on the surface, determining whether the mouse is removed from the surface, and continuing to move the displayed cursor on the screen in the certain direction upon detection of no movement of the mouse and detection of the mouse being no longer in contact with the surface.

32. The system of claim 31, further including:

means, coupled between the mouse and the display, for stopping the screen from displaying the cursor moving in the certain direction when the mouse re-contacts the surface.

33. The system of claim 31, further including:

circuitry, coupled between the mouse and the display, that stops the screen from displaying the cursor moving in the certain direction when the mouse re-contacts the surface.

34. A system for controlling movement of a cursor, the system comprising:

a display device having a screen that displays the cursor in one of an array of coordinate positions;

a mouse that is movable on a surface and is removable from the surface, the screen displaying the cursor moving from a first coordinate position in a certain direction to a second coordinate position of the array of coordinate positions when the mouse moves on the surface;

a processor, coupled between the mouse and the display, that monitors movement of the mouse on the surface, determines whether the mouse is removed from the surface, and continues to move the displayed cursor on the screen in the certain direction upon detection of no movement of the mouse and detection of the mouse being no longer in contact with the surface.

* * * * *